Aug. 8, 1939. S. P. CALDWELL 2,168,761
DEVICE FOR VIEWING FILMS
Filed Jan. 25, 1938 2 Sheets-Sheet 1
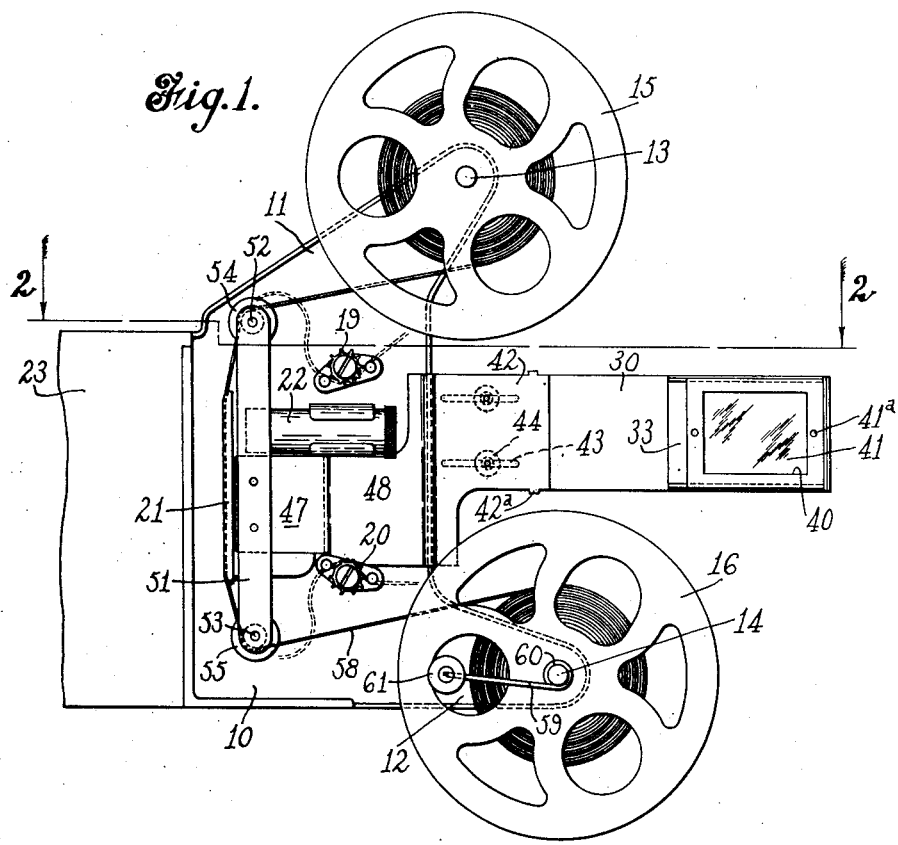
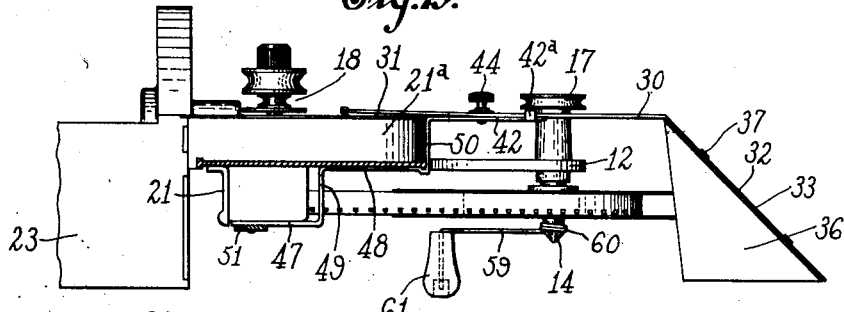
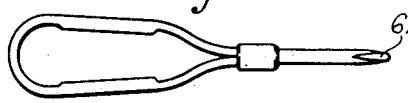
Inventor
Samuel P. Caldwell
By Rockwell & Bartholow
Attorneys Aug. 8, 1939. S. P. CALDWELL 2,168,761
DEVICE FOR VIEWING FILMS
Filed Jan. 25, 1938 2 Sheets-Sheet 2
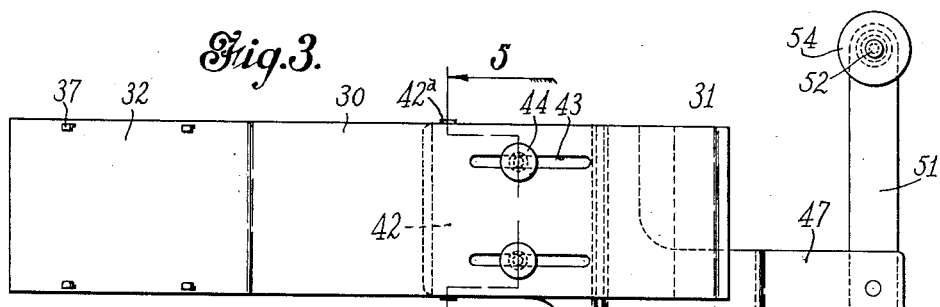
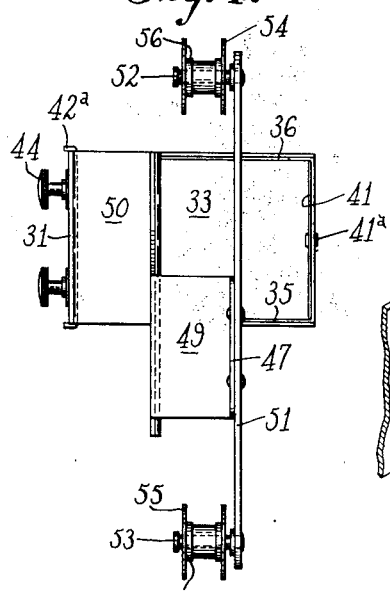
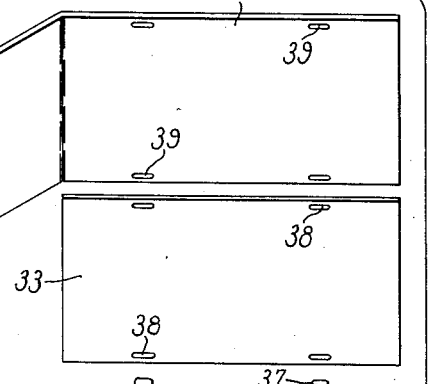
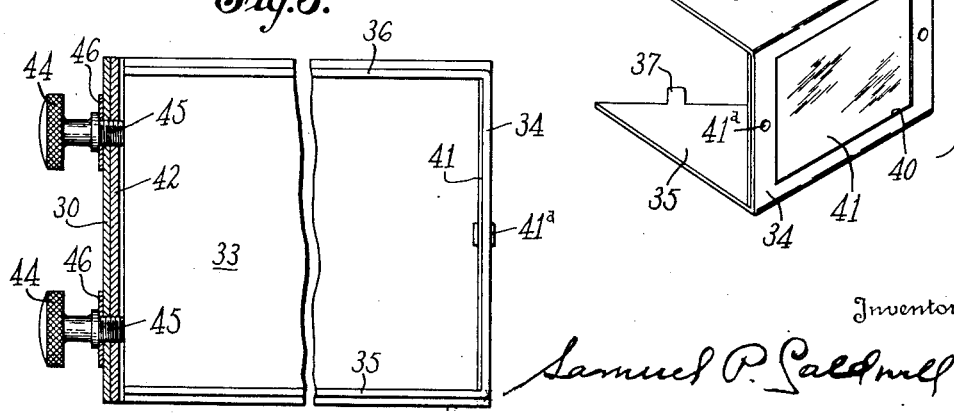
Inventor
Samuel P. Caldwell
By Rockwell & Bartholow
Attorneys Patented Aug. 8, 1939

2,168,761

UNITED STATES PATENT OFFICE 2,168,761

DEVICE FOR VIEWING FILMS

Samuel P. Caldwell, Hamden, Conn., assignor to The Greist Manufacturing Company, New Haven, Conn., a corporation of Connecticut Application January 25, 1938, Serial No. 186,834

6 Claims. (Cl. 88—24)

This invention relates to a device for viewing and editing films and more particularly to an attachment which may be quickly attached to or removed from any home movie projector regardless of the make thereof, so that the films may be fed slowly through the projector and shown upon a small screen which is integral with the attachment and which is placed in a position where it may face the operator of the machine so that when he is sitting before the machine he may control its operation and view the film shown upon the screen at the same time.

Films which are taken by so-called home movie cameras and shown by means of the home movie projectors are of very small size. When these films are taken it is ordinarily necessary to "edit" them for several reasons. Usually it is desired to insert titles at various places in the film and this must usually be done after the film is taken by cutting the film, inserting the title and thereafter splicing the film so that it will be a continuous band. Also, it is very often necessary to delete certain portions of the film and also to insert "retakes" or additional views which may have been taken at another time. This requires viewing the film at a slow speed either by projecting it upon a screen where it will appear enlarged or by viewing the film directly without the aid of the projecting apparatus or enlargement. The latter process is practically impossible with the ordinary small size film employed in home movie machines as the picture is so small that it is impossible to view it satisfactorily without enlargement. For this reason, some manufacturers have resorted to so-called "film viewers" which are usually separate devices upon which the film may be placed and run through the device slowly so that it may be seen. Such a method of viewing films has several disadvantages in that it entails, of course, considerable expense to make a separate device for this purpose, and such devices must employ special rewind mechanisms so that the film may be unwound from the usual reel used by the projector and wound upon the special reel in feeding it through the viewer. Also, unless the film viewer is provided with its own source of power, the film must be wound and rewound by hand, and in any event cannot be shown upon such a film viewer as a moving picture but must be shown as a succession of still views, and it is, of course, desirable in some cases to be able to view the film as a movie.

It is contemplated by the present invention to provide a simple attachment which may be attached to any moving picture projector and which will carry a screen in a position to show the film to the operator of the projector. The film may, if desired, be shown as a moving picture by employing the usual projecting apparatus, and also can be drawn through the device slowly by hand power and viewed in that manner as a succession of still pictures. Sufficient enlargement of the film is effected to enable the operator to view the film slowly at a convenient size, and this enables the editing to be done accurately and with great rapidity, as the operator can tell the point at which it is desirable to cut the film and add or remove any desirable or undesirable portion or to insert the title. Moreover, the present device enables the operator to use the spool spindles of the projector for rewinding and also to use the same reels as are used in the projecting device as well as using the light source and the lens system of the projector.

One object of the invention is the provision of an attachment for a projecting device, the attachment carrying a screen to cooperate with the projector in showing the films.

A further object of the invention is the provision of a screen-carrying attachment for moving picture projecting machines which may be readily attached to or removed from the projector and which will enable the film to be drawn slowly through the machine for editing purposes, and will also enable it to be shown on the screen as a moving picture if desired.

A still further object of the invention is the provision of a screen-carrying attachment for a moving picture projector which attachment will also be provided with guide means for guiding the film through the gate and track of the projector and by means of which the film may be shown on the screen, using the light source and lens system of the projector.

A still further object of the invention is the provision of an attachment of the character described which will be readily attachable to the ordinary projector and provided with means by which the film may be viewed, using the light source and lens system of the projector in combination with means for marking the film at the point where it is desirable to cut the same for insertion of additional views or removal of some parts of the film.

To these and other ends the invention consists in the novel features and combinations of parts to be hereinafter described and claimed.

In the accompanying drawings:

Fig. 1 is a front elevational view of a form of moving picture projector having the film-viewing attachment secured thereto;

Fig. 2 is a sectional view on line 2—2 of Fig. 1;

Fig. 3 is a rear plan view of the film-viewing attachment alone;

Fig. 4 is an end elevational view of the attachment;

Fig. 5 is a sectional view on line 5—5 of Fig. 3;

Fig. 6 is an exploded view of the outer end of the attachment, showing the screen and associated parts; and Fig. 7 is a top view of the stylus for marking the film;

Fig. 7A is a side view of the same.

To illustrate a preferred embodiment of my invention I have shown in Figs. 1 and 2 a portion of one form of ordinary home movie projector machine, comprising a frame 10 having arms 11 and 12 in the ends of which are carried spindles 13 and 14, upon which spindles are mounted the film-carrying spools or reels 15 and 16. In the present instance the reel 15 is the one normally carrying the film when the device is to be used, the film being wound from this reel on to the reel 16 as it is shown.

The spindles 13 and 14 project through the arms 11 and 12 and are provided upon their rear ends with driving pulleys, one of which is shown at 17 in Fig. 2, which pulleys are usually driven by means of a belt (not shown), the belt being in turn driven from the pulley 18 and the latter being driven from the power source (not shown) of the device.

In Fig. 1 I have shown the usual feed sprockets 19 and 20, which are rotatably mounted upon the frame 10 and which serve to control the feed of the film through the projector across the track 21, these sprockets being driven through gearing (not shown) in the case 21a, mounted on the frame 10. The usual lens barrel is shown at 22 which, as will be understood, contains the usual projecting lens of the device, the film being illuminated in the usual way by a light source (not shown), in the casing 23. It will be understood that the elements heretofore described are those of a common form of moving picture projecting machine which is familiar to those skilled in the art and it will need no further description as its construction and operation are well understood.

The film-viewing attachment is shown more particularly in Figs. 1, 2 and 3 and comprises a plate 30 which may be made of sheet metal and which is of sufficient length so that its rear end 31 lies against the back of the gear case 21a. The forward end of this plate extends to an appropriate distance in front of the projector, and is provided with a reflector-carrying portion 32 disposed at an angle of substantially 135° to the main portion of the plate. Upon the support 32 is mounted a reflector 33, as shown more especially in Fig. 6. A screen-carrying frame is also secured to the supporting portion 32, this screen-carrying frame consisting of a front frame portion 34, and upper and lower hood members or wings 35 and 36, these members being provided with lugs 37 which may be inserted through openings 38 in the reflector 33, and registering openings 39 in the supporting member 32, and thereafter bent over to secure the screen frame and at the same time the reflector 33 to the support 32. The screen frame proper 34 is as shown in Figs. 1 and 6 cut away to provide a relatively large opening 40, and a screen 41 is secured to the sides of the frame by rivets 41a and fills the opening 40.

To the plate 30 is adjustably secured a second plate 42 which, as will be described hereinafter, cooperates with the rear portion 31 of the plate 30 to form a clamp to hold the attachment in place. It will be noted that, as shown in Fig. 1, the plate 30 is provided with a pair of parallel slots 43, and screws 44 are inserted through these slots and are provided with threaded ends 45 to be screwed into the plate 42. If desired, washers 46 may be used below the screws, and it will be obvious that the plate 30 may be adjusted with respect to the plate 42 as permitted by the slots 43, and secured in any desired position of adjustment by tightening the screws 44. This permits the reflector 33 and screen 41 to be adjustable as to their distances from the lens in the lens tube 22 to regulate the size of the picture shown upon the screen. The plate 42 is provided with guide lugs 42a which embrace the edges of the plate 30 and hold these plates in sliding engagement.

The rear portion of the plate 42 is provided with offset portions 47 and 48, these portions being joined to the plate by the laterally extending shoulders 49 and 50. From reference to Fig. 2 it will be seen that the portion 50 is of sufficient width to clear the gear box 21a so that when the members 30 and 42 are clamped together by the screws 44, the gear box will be clamped between the portions 31 and 48, which are somewhat resilient, and by this means the attachment is secured to the projector. The rear stepped portion 47 is offset from the portion 48 to clear other parts of the projector, and it will be understood that the shape of the rear portion of the member 42 will usually be such as to conform to the projector with which it is employed, so that it may be clamped in position and clear or pass over the various elements of the projector.

As shown more particularly in Figs. 3 and 4, a vertically extending member 51 is secured to the portion 47 of the plate 42. At the ends of the member 51 are secured short shafts or pins 52 and 53, upon which are rotatably mounted sheaves or guide pulleys 54 and 55. The width of these guide pulleys is somewhat less than the length of the pins 52 and 53, so that the pulleys are permitted a floating action lengthwise of the pins or spindles upon which they are mounted, to enable them to align with the film unwinding from the reel 15. It will also be noted that the hub portions of these pulleys are provided with shoulders 56 and 57, so that only the edge portion of the film is engaged. The central portion of the pulley hub lying between these shoulders, being relieved, will not contact with that portion of the film which bears the pictures.

The position of these guide pulleys when the attachment is in place is shown in Fig. 1, and it will be seen that the film 58, in passing from the reel 15 to the reel 16, or vice versa, is guided by these pulleys through the track 21 of the projector, past the lens tube 22 in the same manner as if the projector were being used, so that the light source and lens system will operate in the usual manner. If desired, the film 58 may be also passed about the feed sprockets 19 and 20, which may or may not be employed in combination with the guide pulleys 54 and 55.

From the above description it will be apparent that a film may be placed upon the spindle 13 of the projecting device in the usual way, and the film drawn over the guide pulleys 54 and 55 on to the reel 16, and the pictures of the film will be projected upon the screen 41 after being reflected and turned through an angle of substantially 90° by the reflector 33. The operator, being in front of the screen, will be in the most advantageous position to view the pictures upon the screen facing him.

If it is desired to draw the film through by hand, this may be readily accomplished by turning the wind-up reel 16 by means of the crank 59. This crank, as shown, comprises a stiff wire having one end coiled, as shown at 60, and a handle 61 attached to the other end. The coil 60 may be looped over the conical end of the spindle 14, and when the crank is turned in a clockwise direction, the coil will tighten upon the spindle and turn it. Rotation of the crank in the reverse direction will cause the coil to loosen and the crank may readily be withdrawn from the spindle. In rewinding, the crank may be removed from the spindle 14 and applied to the spindle 13, when the rewinding is done by hand, or, if desired, the rewinding may be performed in the usual manner by the power mechanism of the projector itself.

It will be understood that in addition to drawing the film through by hand, the regular power apparatus of the projector may be used, if desired, and the film shown as a movie upon the screen 41.

When the operator, while viewing the film, reaches a portion of the film where cutting and splicing is desired, he may mark that portion of the film by means of the stylus 62, shown in Fig. 7. The showing of the film will then be continued until he arrives at the other end of the portion which is to be removed, when it also will be marked. This portion of the film may then be cut out and the remaining ends spliced in the usual manner.

It will be apparent that my attachment, while being inexpensive and attachable to any ordinary home projector, will enable the user to view and edit the film in a very convenient and rapid manner, and as it uses the regular reels or spools of the projecting device, and also the light source and lens system of the projector, as well as the power system of the projector, if desired, there will be no duplication of parts, as is necessary when a separate film-viewing device is employed.

While I have shown and described a preferred embodiment of my invention, it will be understood that it is not to be limited to all of the details shown, but is capable of modification and variation within the spirit of the invention and within the scope of the appended claims.

What I claim is:

1. A film-viewing attachment for a standard moving picture projector comprising a supporting member carrying at its forward end a reflector and a screen in cooperative relation with the reflector, a second member adapted to be releasably secured to the first intermediate the ends of the latter and extending rearwardly of the point of securement in spaced parallel relation with the first member, and means for drawing said members together to clamp a part of the projector therebetween and support the reflector in optical alignment with the projection beam.

2. A film-viewing attachment for a moving picture projector comprising a supporting member carrying at its forward end a reflector and a screen in cooperative relation with the reflector, a screen member adapted to be releasably secured to the first intermediate the ends of the latter and extending rearwardly from said point of securement, one of said members being offset laterally to be disposed in spaced parallel relation with the other member, and means for drawing said members together to clamp a part of the projector therebetween and support the reflector in optical alignment with the projection beam.

3. A film-viewing attachment for a moving picture projector having a standard comprising an elongated supporting member carrying at its forward end a reflector and a screen in cooperative relation with the reflector, said screen being disposed in a plane substantially parallel to the supporting member, means on the rear end of said supporting member providing clamping jaws to embrace a part of the projector standard, means to draw said jaws together to clamp said part therebetween and support the reflector in optical alignment with the projection beam.

4. A film-viewing attachment for a moving picture projector having a standard comprising an elongated supporting member carrying at its forward end a reflector and a screen in cooperative relation with the reflector, said screen being disposed in a plane substantially parallel to the supporting member, means on the rear end of said supporting member providing clamping jaws to embrace a part of the projector standard, means to draw said jaws together to clamp said part therebetween and support the reflector in optical alignment with the projection beam, and means to adjust the distance of said reflector from the standard when clamped thereon.

5. A film-viewing attachment for a moving picture projector comprising an elongated plate-like member carrying upon its forward end a reflector and a screen in operative relation to the reflector, a second plate adjustably carried by the first at a point intermediate the ends of the latter, means to secure said plates together in adjusted positions, said second plate extending rearwardly from said point of securement in spaced relation to the rear end of said first plate to provide therewith a pair of opposed clamping jaws, and said securing means serving to draw said jaws together in clamping relation about a part of the projector to hold the attachment in place with the reflector in optical alignment with the projection beam.

6. A film-viewing attachment for a moving picture projector comprising an elongated plate-like member carrying upon its forward end a reflector and a screen in operative relation to the reflector, a second plate adjustably carried by the first at a point intermediate the ends of the latter, means to secure said plates together in adjusted positions, said second plate extending rearwardly from said point of securement in spaced relation to the rear end of said first plate to provide therewith a pair of opposed clamping jaws, and said securing means serving to draw said jaws together in clamping relation about a part of the projector to hold the attachment in place with the reflector in optical alignment with the projection beam, a transversely extending arm secured on said second plate to project therefrom at both ends, and film guide pulleys carried by the ends of said arm.

SAMUEL P. CALDWELL.